United States Patent Office 2,851,443
Patented Sept. 9, 1958

2,851,443

QUENCHABLE COPOLYESTERS OF A GLYCOL, TEREPHTHALIC ACID AND AN ALKYLENE DIAMINE DICARBOXYLATE AND THEIR PREPARATION

Jack L. R. Williams and Thomas M. Laakso, Rochester, N. Y., assignors to Eastman Kodak Company, Rochester, N. Y., a corporation of New Jersey No Drawing. Application April 26, 1955
Serial No. 504,106

16 Claims. (Cl. 260—75)

This invention relates to linear copolyesters containing internal amide linkages and to the manufacture thereof and shaped articles prepared therefrom.

The linear condensation polymers which have achieved commercial utility heretofore generally fall into two classes, viz. the polyesters and the polyamides. The polyesters are condensation products of one or more glycols with one or more dicarboxylic acids, as typified by the terephthalate polyesters. The polyamides are condensation products of dicarboxylic acids with diamines, as typified by nylon-type polymers. Both broad types of condensation polymers in highly polymeric form were shown by Carothers in U. S. 2,071,250.

Another type of condensation polymer known as polyester-amide polymers was also disclosed by Carothers, and represented an attempt to combine the advantages of the polyesters and the polyamides in a single polymer without the disadvantages inherent in both types. These polyester-amides were usually prepared by direct coreaction of glycol, dicarboxylic acid and diamine, but their properties were not sufficiently good to make these materials of any great commercial value. In the preparation of such polyester-amides, there are competing reactions of polyester formation and polyamide formation, and the heterogeneous products were difficult to obtain at the desired inherent viscosity and usually had undesirably low melting points and mechanical properties.

In the preparation of condensation polymers, it is desirable to be able to readily carry out the condensation polymerization to a fiber-forming viscosity, which usually necessitates an inherent viscosity of at least 0.4 and often of the order of 0.7–1.0 or higher in order to achieve film and fiber-forming products with the desired physical properties. When the fiber-forming stage is reached, the polymers are capable of being oriented by being stretched either longitudinally or laterally or both, and the oriented polymers possess unusual tensile strength, flexibility, and similar physical properties. The polyesters in particular have exceptionally good physical characteristics as regards melting point, strength, flexibility, wear resistance and the like. The polyesters, and particularly the terephthalate polyesters, however, achieve these properties at the sacrifice of dyeability, moisture absorption, solubility and workability. It has been recognized that the presence of amino groups or amide linkages in condensation polymers should improve dyeability, moisture absorption, etc., but heretofore the other properties such as softening temperature have been lowered so greatly in polyester-amides that the polymers of this type have not achieved widespread commercial acceptance. Furthermore, the presence of amide linkages often results in products with undesirable color.

In the application of Laakso and Williams, Serial No. 504,107, filed concurrently herewith, new and highly useful linear condensation polymers are disclosed and claimed which possess a unique combination of the properties characteristic of polyesters and polyamides without the sacrifice of other desirable properties. These new polymers are characterized by a regularly recurring structure of structural groups of the formula

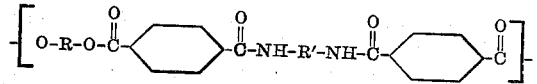

wherein R and R' are the same or different alkylene groups containing 2–10 carbon atoms, and result from the condensation polymerization of one or more alkylene glycols of 2–10 carbon atoms with one or more monomeric esters of N,N'-bis(p-carboxybenzoyl)alkylene diamines containing 2–10 carbon atoms.

These polyesters possess melting points above 200° C., are readily prepared by short period polymerization processes, and can be readily extruded into fibers or sheets (including films) which can be oriented by drawing to give high strength, wear resistant, flexible products of unusual dyeability coupled with excellent moisture absorption characteristics and unusually high heat distortion temperature. These materials thus possess excellent utility in the manufacture of fibers and sheeting, and are of particular utility for use as film base or support layers for photosensitive emulsions in photographic film. In some cases, particularly with thicker sections, these polymers show some tendency to crystallize slightly before quenching occurs. Consequently, it is desirable to improve the quenching properties of these polymers without affecting the other desirable properties to an objectionable degree.

It is accordingly an object to provide new copolyesters having improved quenchability in addition to the excellent melting point, tensile strength, flexibility, wear resistance, dyeability, moisture absorption and similar properties characteristic of unmodified polyesters from glycols and esters of N,N'-bis(p-carboxybenzoyl)alkylene diamines.

It is another object of the invention to provide methods of preparing such improved copolyesters.

Another object of the invention is to provide copolyesters containing internal amide linkages but free of the disadvantages normally inherent in polyester-amides.

Another object of the invention is to provide new and improved copolyesters which are particularly useful in the manufacture of synthetic fibers and of film or sheeting, particularly for use as base or support in photographic film applications; and which have improved processing characteristics particularly as regards obviating crystallization during quenching.

Other objects will be apparent from the description and claims which follow.

These and other objects are attained by means of this invention wherein copolyesters having a unique combination of properties are prepared by coreacting bifunctional monomeric reactants which consist functionally of alkylene glycol, N,N'-bis(p-carboxybenzoyl)alkylene diamine and terephthalic acid. Despite the presence of the third component, the copolyesters of the invention possess the highly advantageous combination of properties normally possessed only by the homogeneous polyesters consisting essentially of recurring structural units of the formula

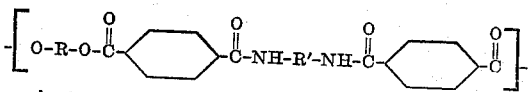

wherein R and R' are the same or different alkylene groups containing 2–10 carbon atoms; and in addition, these copolyesters exhibit improved quenchability facilitating the manufacture of extruded articles therefrom. The copolyesters embodying the invention are linear in structure and can be readily oriented by drawing to give the excellent mechanical characteristics exhibited by oriented polyesters.

In accordance with the invention, the copolyesters are prepared by concomitant condensation polymerization of three distinct classes of materials, viz. those which enter functionally into the condensation polymerization as alkylene glycols containing 2–10 carbon atoms, those which enter functionally into the condensation polymerization as N,N'-bis(p-carboxybenzoyl)alkylene diamines wherein the alkylene group contains 2–10 carbon atoms, and those which enter functionally into the condensation polymerization as terephthalic acid. Thus, the glycol or glycols form the dihydroxylic component and the acids form the dicarboxylic component. These bifunctional reactants can be used in the form of the free glycols and acids, or in the form of esters of one or more of such reactants or in the form of ester-forming derivatives such as halides or the like. Since the terminal groups are split out in the initial condensation stage of the condensation polymerization, their nature does not affect the nature of the copolyester, and the unesterified reactants, esterified reactants and the like are functionally equivalent as concerns the process and product. Generally, the glycols are used in free form and the acidic components in esterified form for facilitating the course of the reaction, although it will be understood that the glycols can be esterified or one or more of the acids can be in free form as desired.

In accordance with the invention, one of the reactants employed is a monomeric dicarboxylic compound of the formula

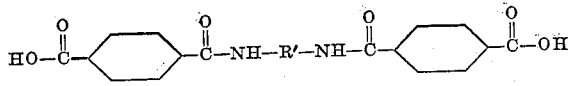

wherein R' is an alkylene group, preferably a polymethylene group, containing 2–10 carbon atoms, and such dicarboxylic compound is preferably employed as a phenyl or alkyl diester and desirably as a lower alkyl diester wherein the alkyl group contains 1–6 carbon atoms for ease of removal of the alcohol liberated in the initial ester-interchange stage of the reaction. In order to achieve the improved results characteristic of the invention, this dicarboxylic compound is employed as a preformed monomer since there are therefore no competing polyester and polyamide reactions during the polymerization. By use of this preformed monomeric material containing stable internal amide linkages which are unaffected by the polymerization conditions, the products obtained differ greatly from the mixed polyester-amides of random structure obtained by coreacting a glycol, terephthalic acid and a diamine.

The polymers embodying this invention are readily made in viscosities sufficient for formation of fibers having the improved properties characteristic of oriented polymers, and they can readily be made at viscosities of 0.7–1.2 and preferably above about 0.8 with no difficulty. The melting points of the polymers embodying the invention are unexpectedly high, usually being in excess of 200° C. at viscosities of 0.8 or higher even when relatively high concentrations of terephthalic acid component are employed as modifier, melting points of 230–270° C. commonly being obtained. This melting point range compares favorably with that of unmodified polyesters, such as terephthalate polyesters, and is in marked contrast to the melting points of 80–150° C. which are common with previously known polyester-amides prepared by conventional methods. The polymers of the invention also possess great strength, flexibility and wear resistance comparable to the best unmodified polyesters, and in addition possess excellent quenchability together with recurrent amide linkages effective to improve such properties as dyeability, processability and moisture absorption without objectionable color formation.

The esters of N,N'-bis(p-carboxybenzoyl)alkylene diamines employed in practicing the invention can be prepared in any manner which will give the material in monomeric form. Although the phenyl or any of the alkyl diesters can be used, the diisobutyl esters are preferred because of their unique solubility characteristics which facilitate preparation of the monomer. The preferred method for making the monomeric esters of N,N'-bis(p-carboxybenzoyl)alkylene diamines, and particularly the N,N'-bis(p-carboxybenzoyl)polymethylene diamines containing 2–10 methylene groups in the polymethylene unit which are preferably employed, involves reacting one molar proportion of an alkylene diamine, preferably a polymethylene diamine, with two molar proportions of a p-carbalkoxybenzoyl chloride under controlled conditions whereupon the desired monomer is obtained in nearly quantitative yield. The diamine employed can be any of the alkylene diamines containing 2–10 carbon atoms; and, if desired, monomeric mixtures can be prepared by employing two or more diamines which is sometimes desirable when a polymer having particular properties is desired. Of the diamines, either straight or branched chain alkylene diamines can be used, with the polymethylene diamines typified by ethylene diamine, tetramethylene diamine, trimethylene diamine, pentamethylene diamine, hexamethylene diamine, heptamethylene diamine, octamethylene diamine, nonamethylene diamine and decamethylene diamine being preferred.

As indicated hereinabove, the nature of the ester groups on the monomer do not affect the course of the condensation process and the diamine or diamines can be reacted with p-carbophenoxy benzoyl chloride, p-carbomethoxy benzoyl chloride, p-carboethoxy benzoyl chloride, p-carbopropoxy benzoyl chloride, p-carboisopropoxy benzoyl chloride or similar p-carbalkoxybenzoyl chloride as desired to form the dicarboxylic monomer. The dicarboxylic monomers and their preparation is disclosed and claimed in the copending application of Williams and Laakso, Serial No. 504,105, filed concurrently herewith. The preparation of typical dicarboxylate monomers used in practicing the invention is illustrated in the following examples, although it will be understood that other monomers as defined herein can be used in practicing the invention regardless of the method of preparation of such dicarboxylate monomers.

*Example 1*

Under essentially dry conditions, 20 parts by weight (0.3 molar equivalents) of ethylene diamine was dissolved in 250 parts by volume of dry pyridine and the solution chilled to 0° C. With efficient stirring, 127.5 parts by weight (0.6 molar equivalents) of p-carbethoxybenzoyl chloride was added slowly to the solution at a rate whereby the temperature was maintained between 0° and 10° C. Stirring was continued for 15 minutes, and the reaction mixture was then poured into ice water. The light cream colored solid which precipitated was filtered by suction. By recrystallization from ethyl alcohol, pure white N,N'-bis(p-carbethoxybenzoyl)ethylene diamine melting at 245.5°–246° C. was obtained in a yield of 90% of theoretical.

*Analysis.*—Calculated for $C_{22}H_{24}O_6N_2$: C, 64.2; H, 5.8; N, 6.8. Found: C, 64.5; H, 6.1; N, 7.3.

EXAMPLE 2

Under essentially dry conditions, 34.8 parts by weight (0.3 molar equivalents) of hexamethylene diamine was dissolved in 500 parts by volume of dry pyridine and chilled to 0° C. With efficient stirring, 127.5 parts by weight (0.6 molar equivalents) of p-carbethoxybenzoyl chloride was added slowly to the solution while maintaining the solution temperature at 0° to 10° C. Stirring was continued for 15 minutes whereupon the reaction mixture was poured into ice water. The light cream colored solid which precipitated was filtered by suction and recrystallized from ethyl alcohol to give pure white N,N'-bis(p-carbethoxybenzoyl)hexamethylene diamine melting at 207°–208° C., in a yield of 88.8% of theoretical.

*Analysis.*—Calculated for $C_{26}H_{32}O_6N_2$: C, 66.7; H, 6.8; N, 5.9. Found: C, 67.0; H, 7.1; N, 5.9.

EXAMPLE 3

A solution of 80 g. (2 moles) of sodium hydroxide in 300 ml. of water was added, with stirring, to a solution of 161 g. (1 mole) of tetramethylene diamine hydrochloride in 500 ml. of water. To the resulting solution, 1 liter of benzene was added, followed by 198.5 g. (1 mole) of p-carbomethoxybenzoyl chloride which was added all at once with efficient stirring. After 5 minutes, 150 ml. (1 mole) of sodium hydroxide solution was added rapidly. Thereafter at 15 minute intervals, p-carbomethoxybenzoyl chloride and sodium hydroxide solution were added successively until an additional 200 g. of the acid chloride and an additional 150 ml. of caustic solution had been added. When addition was completed, the reaction mixture was stirred for one hour and then poured into cold water to precipitate the product. The white product was filtered, washed with water, dried, recrystallized from dimethyl formamide, washed with alcohol and dried to give white crystalline N,N'-bis(p-carbomethoxybenzoyl)tetramethylene diamine melting at 255–256° C. in a yield of 75.7% of theoretical.

*Analysis.*—Calculated for $C_{22}H_{28}O_6N_2$: C, 64.3; H, 5.8; N, 6.8. Found: C, 64.1; H, 6.1; N, 7.2.

EXAMPLE 4

Under essentially anhydrous conditions, 198.5 g. (1 mole) of p-carbomethoxybenzoyl chloride was added dropwise to a well-stirred solution of 58 g. (0.5 mole) of hexamethylene diamine in 1000 ml. of dry pyridine. The temperature of the reaction mixture was maintained below 50° C. during the addition. The reaction mixture was stirred for one hour, poured into ice water, and the cream colored precipitate was filtered out and recrystallized from alcohol. The yield of pure white N,N'-bis(p-carbomethoxybenzoyl)hexamethylene diamine was 63% of theoretical.

*Analysis.*—Calculated for $C_{24}H_{28}O_6N_2$: C, 65.4; H, 6.4; N, 6.4. Found: C, 65.8; H, 6.4; N, 6.2.

The dicarboxylic monomers useful in practicing the invention can thus be methyl, ethyl, propyl, isopropyl, butyl, isobutyl or other diesters of such dicarboxylic acids as N,N'-bis(p-carboxybenzoyl)ethylene diamine, N,N'-bis(p-carboxybenzoyl)trimethylene diamine, N,N'-bis(p-carboxybenzoyl)tetramethylene diamine, N,N'-bis(p-carboxybenzoyl)pentamethylene diamine, N,N'-bis(p-carboxybenzoyl)hexamethylene diamine, N,N'-bis(p-carboxybenzoyl)heptamethylene diamine, N,N'-bis(p-carboxybenzoyl)octamethylene diamine, N,N'-bis(p-carboxybenzoyl)nonamethylene diamine, and N,N'-bis(p-carboxybenzoyl)decamethylene diamine; and such monomers can be employed singly or in combinations of two or more of these or similar dicarboxylate monomers as defined herein for condensation with the glycol and the terephthalic acid or ester.

In practicing the invention, one or more of the amide-containing dicarboxylate monomers together with terephthalic acid, preferably in ester form, are condensed with one or more alkylene glycols containing 2–10 carbon atoms by heating the reaction mixture in the presence of an ester-interchange catalyst whereby glycol diesters of the acidic components are formed in an initial stage, and these glycol diesters undergo condensation polymerization by continued heating under reduced pressure, with evolution of glycol, until the polymer reaches a fiber-forming state. The glycol can be a straight or a branched chain glycol or mixtures of glycols, the polymethylene glycols preferably being employed predominantly. In the practice of the invention, the amide-containing dicarboxylic monomer constitutes 10–95 mole percent and the terephthalate constitutes 90–5 mole percent of the total weight of acidic components employed. Since the terephthalate component tends to lower the melting point with increasing concentration, it desirably is employed in an amount such that the melting point of the copolyester is above 200° C. for use in the fiber and film fields, amounts of 5–50 mole percent of the terephthalate component and 95–50 mole percent of the amide-containing dicarboxylate component based on the total weight of acidic components being desirably employed. Since the use of short chain glycols or amide-containing monomers containing short chains between the amide groups tends to raise the melting point of the polymers, the amount of terephthalate component employed is desirably larger so as to bring the melting point of the copolyester within the preferred range of 200–270° C.

The glycols which are desirably employed for reaction with the acidic components are the polymethylene glycols such as ethylene glycol, trimethylene glycol, tetramethylene glycol, pentamethylene glycol, hexamethylene glycol, heptamethylene glycol, octamethylene glycol, nonamethylene glycol, and decamethylene glycol which can be employed singly or in mixtures of two or more, although other alkylene glycols such as 2,2-dimethyl-1,3-propanediol and the like can be used alone or preferably together with a predominant amount of polymethylene glycol.

In the initial stages of the process embodying the invention, the glycol of the formula

wherein R is an alkylene group of 2–10 carbon atoms undergoes ester-interchange with the acidic components to give a mixture of glycol esters of the formulas

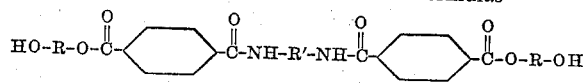

and

These glycol esters then undergo condensation polymerization with liberation of glycol to form a highly polymeric linear copolyester.

Under ordinary reaction conditions, there is very little degradation of the amide-containing dicarboxylate monomer and consequently the polymerization process is substantially completely a polyester reaction with little or no polyamide formation. In carrying out the process embodying the invention, one molar proportion of the mixture of dicarboxylate monomers is reacted with at least two molar proportions of the glycol. The terephthalate portion of the dicarboxylate monomers can be terephthalic acid or a phenyl or higher alkyl diester of terephthalic acid or an ester-forming derivative thereof, but best results are obtained employing a lower alkyl diester of terephthalic acid wherein each alkyl group contains 1–6 carbon atoms. Thus the preferred terephthalates are typified by but not limited to dimethyl terephthalate, diethyl terephthalate, diisopropyl terephthalate, dibutyl terephthalate, diisobutyl terephthalate, dihexyl terephthalate and the like.

In carrying out the process, an excess of glycol is preferably employed. The initial ester-interchange is readily effected by heating the mixture of glycol component and dicarboxylate components in the presence of an ester-interchange catalyst and at a temperature above the melting point of the components. The initial stage of the reaction is usually carried out at atmospheric pressure and a temperature of 100–300° C. and preferably 200–300° C. for best results, although lower or higher temperatures can be employed in some cases. During the course of the ester-interchange in the initial stage of the process, monohydric alcohol is liberated corresponding to the nature of the ester groups on the dicarboxylate monomers (or water when the free dicarboxylic acids are used). For best results, the water or alcohol is removed from the reaction zone as it is liberated in order to shift the reaction equilibrium to optimum formation of the glycol esters of the dicarboxylate monomers. As has been indicated, the dicarboxylate monomers are desirably employed in the form of lower alkyl diesters for ease of removal of the liberated alcohol. If desired, however, higher alkyl or phenyl esters can be used, as well as free dicarboxylic acids or ester-forming derivatives thereof such as salts, halides or amines.

The process is facilitated by use of an ester-interchange catalyst, a large number of such catalysts being known to the art. Typical ester-interchange catalysts which can be employed include the metal hydrides such as calcium hydride, lithium hydride, sodium hydride, or the like; metal oxides such as antimony trioxide, litharge, cerium oxide, germanium oxide and the like; double metal catalysts such as lithium aluminum stearate, calcium aluminum acetate and similar catalysts containing an alkali or alkaline earth metal and an amphoteric metal, alcoholates of one or more of such metals as sodium, potassium, lithium, calcium, titanium, tin, magnesium, aluminum, zinc, and the like, alkaline reacting salts such as borates and carbonates of the alkali metals, free metals such as sodium, potassium, lithium, calcium, cobalt, tin, germanium, cerium, magnesium, tin, lead, antimony and the like as well as salts of these and similar metals and other well known ester-interchange catalysts such as zirconium compounds and the like. Particularly good results are obtained with the titanium compounds such as titanium butoxide, sodium hydrogen titanium ethoxide butoxide and the like, preferably together with water as a co-catalyst for low color formation. The catalyst or catalyst mixture is preferably employed in a concentration of at least 0.001% by weight based on the weight of reactants with amounts of 0.001% to 0.05% by weight being preferred. Larger amounts of catalyst can also be used although such larger amounts usually are not necessary for optimum results.

The initial stage of the reaction is usually complete in 5–30 minutes; and, if desired, the temperature can be raised or the pressure reduced at the end of the first stage to effect completion of the removal of the alcohol liberated during the initial stage. Polymerization of the glycol ester of the dicarboxylic compound is then effected to the desired degree by continuing the heating under reduced pressure at least until the polymer reaches the fiber-forming stage. The polymerization can be effected by first obtaining a low viscosity polymer in powder form, and then continuing the polymer build-up in powder form under vacuum, or by continuing the heating after the initial stage under reduced pressure whereby the polymer remains molten until the desired molecular weight and inherent viscosity is achieved.

The polymers embodying the invention are polymerized until a fiber-forming stage is achieved, i. e. until a rod dipped into the melt will pull a filament when drawn from the melt. Usually for optimum results, the polymerization is carried out until an inherent viscosity of at least 0.8 is attained with viscosities of 0.8–1.1 being preferred, although lower or higher viscosities may be desired in certain cases. The polymers of the invention usually have melting points above 200° C. The preferred polymer compositions are those having melting points in the range of about 240°–280° C., since the polymers melting above about 280° C. are difficult to extrude and process in commercial practice.

As has been indicated, any one or more of the alkylene glycols containing 2–10 carbon atoms can be condensed with the terephthalate component and one or more of the amide-containing dicarboxylate monomers. The resulting copolyesters can be used alone or in blends of two or more of such polymers, or blends of such polymers with other polymeric materials such as polyesters, polyamides, copolyesters, polyester-amides and the like. The polymers of the invention can be quenched following polymerization by cooling to a temperature below the minimum crystallization temperature; and, even in thick sections have greatly improved resistance to crystallization during quenching. This improved quenchability facilitates the processing of the polymers and particularly the manufacture of shaped articles such as fibers, films and the like by melt extrusion. The polymers are quenched to a temperature below 100° C. and usually below 80° C.; although, unexpectedly, the polymers will undergo orientation above the minimum crystallization temperature. The polymerization proceeds rapidly and ordinarily the fiber-forming stage is reached within 10–30 minutes, although the time necessary for polymerization will vary depending upon the temperature employed, the kind and amount of catalyst, the pressure and similar variable factors. The polymerization is facilitated by removal from the reaction zone of the glycol liberated during the polymerization.

The polymers thereby obtained can be extruded from the melt to form filaments or sheets as desired. The resulting shaped articles are then oriented by being stretched either laterally or longitudinally or both whereby a marked increase in physical properties is obtained. The degree of stretching will vary somewhat depending upon the polymer composition and the properties desired, but sheets, films, fibers, etc. are usually stretched 200–600% of their original extruded dimension for best results. The shaped articles are usually cold-drawn, i. e. drawn at a temperature between the second order transition temperature and the minimum crystallization temperature of the polymer; although, unlike the usual polyesters, the polymers embodying the invention can be oriented by drawing at temperatures of as much as 50° above the minimum crystallization temperature in some cases.

The fibers, films, sheets, etc. which have been drawn are characterized by exceptional physical and mechanical properties, including strength, flexibility, wear resistance and the like, comparable to terephthalate polymers. In addition, the polymers of the invention have unusually high heat distortion temperatures which are often as much as 40° C. above the ordinary heat distortion temperature of terephthalate polyesters which have been oriented but not relaxed. The polymers of the invention thus possess the excellent melting point and physical characteristics of the best polyesters known heretofore but combine this with unusually high heat distortion temperatures, excellent dye affinity, and moisture adsorption higher than that of conventional polyesters. The high heat distortion characteristics are attained by heating the oriented polymer above its minimum crystallization temperature, as for example at 170° C., to cause crystallization but without the necessity of shrinking the stretched polymer as is usually the case.

In fiber applications, filaments having strength of as high as 6–8 grams per denier can be readily obtained, combined with good dyeability and moisture absorption which usually are sacrificed in conventional polyesters. The polymers also possess excellent utility in photographic applications as for example for use as film base for carrying photosensitive silver halide emulsions in black-and-white or color film. The unusually high heat distortion temperature also makes these polymers unique for applications where dimensional stability against thermal distortion is a serious problem.

Any of the copolyesters of bifunctional reactants consisting functionally of alkylene glycol containing 2–10 carbon atoms and dicarboxylate monomers consisting functionally of 10–95 mole percent of N,N'-bis(p-carboxybenzoyl)polymethylene diamine and 90–5 mole percent of terephthalic acid, are within the scope of the invention. For manufacture of films and fibers, it is usually desirable that the total number of carbon atoms in the glycol and in the polymethylene unit between the amide groups in the amide-containing dicarboxylate monomer be at least 10 in at least half of the reactants employed, and the polymers showing optimum properties have the total number of carbon atoms referred to equal to at least 12 in at least one quarter of the reactants. The polymers which have shown particular utility are those wherein the glycol is butane-1,4-diol, pentane-1,5-diol or hexane-1,6-diol, the amide-containing monomer is an ester of N,N'-bis(p-carboxybenzoyl)ethylene diamine, N,N'-bis(p-carboxybenzoyl)tetramethylene diamine or N,N'-bis(p-carboxybenzoyl)hexamethylene diamine, and the terephthalate component amounts to 5–60 mole percent of the total weight of dicarboxylate components. These copolyesters are linear in configuration and have melting points above 230° C. and usually in the range of 240–270° C., and can readily be extruded from the melt into films, sheets, fibers or similar shaped articles which, after drawing, possess excellent mechanical and physical properties combined with good dye affinity and moisture absorption characteristics.

In the manufacture of film or sheeting, the polymer is desirably extruded from the melt either onto a casting roll or between paired rolls and then drawn both longitudinally and laterally, either concomitantly or successively, to from 100–600% of its original dimensions in order to orient the molecules. Thereafter, the oriented film or sheet is desirably heated at a temperature above the minimum crystallization temperature until the desired degree of crystallization results. In the case of film to be used for photographic applications where it is desirable to coat the film with photosensitive silver halide emulsions or other coating layers, the film can be coated with a subbing material, such as a resin or copolymer sub before the orientation or between the drafting steps or before the heat treatment following orientation. In some cases, particularly with modified polyester subs of good solubility, it is more convenient to sub the oriented and crystallized film after the film processing has been completed. The subbed film can then be supplied with the usual photosensitive emulsion layers, antihalation backing, etc. in accordance with well known photographic practice.

In the manufacture of fibers, the molten polymer is extruded through a spinneret and quenched. The resulting fiber is then drafted 50–600% and heat treated for crystallization. The resulting fibers have hot bar sticking temperatures above 200° C. in most cases, combined with strength of the order of 6–8 grams per denier, excellent dye affinity for most textile dyes and moisture absorption characteristics which make the fibers resemble natural fibers more than is generally the case with synthetic polyester fibers. In contrast to the usual polyesters containing amino groups, very little color formation is observed and textiles prepared from fibers embodying the invention can be dyed to deep shades or with pastel dyes or fleeting tints as desired. Consequently, the polymers of the invention show unique versatility among the synthetic condensation polymers since they combine the desirable characteristics of both the polyesters and the polyamides without the disadvantages of either type.

The improved results obtained in accordance with the invention appear to result from the absence of competing reactions of different rates during polymerization, and particularly to the absence of competing polyester and polyamide reactions. The results are in sharp contrast to those obtained by more direct methods using a glycol, a free diamine and a terephthalate which might be expected to give similar results since all of the units of the polymer are present in monomeric form. Such other methods which do not employ the monomeric N,N'-bis(p-carboxybenzoyl)alkylene diamine (or ester thereof), however, do not give products comparable to those of the present invention, even though the products of the present invention resemble polyester-amides in overall composition. Thus, for example, among the conventional polyester-amide processes which do not give the greatly improved results obtained in accordance with the invention are such methods as reacting an alkyl terephthalate with a polymethylene diamine followed by reaction of the product with a polymethylene glycol, reacting an alkyl terephthalate with a polymethylene glycol followed by reaction of the product with an alkylene diamine, and coreacting a glycol, diamine and terephthalate concomitantly. In such cases, the difference in rate constants between such reactions as ester-ester interchange, ester-amine interchange, and glycol-amide interchange appears to be the governing factor hampering the formation of polymers comparable to those of the present invention. The amine-ester interchange usually proceeds the most rapidly; and, in practice, the polyamide usually is produced in preference to all other species except when the ratio of components in order of addition is such that the possibility of polyester-amides of regular structure is precluded. It is usually difficult if not impossible to stop the direct reactions at the N,N'-bis(p-carbalkoxybenzoyl)polymethylene diamine monomer which appears necessary to achieve the advantageous properties of the polymers of this invention.

The improved results obtained in accordance with this invention are best illustrated in contrast to the results obtained by conventional polyester-amide processes. The following Examples 5–9 are typical of conventional polyester-amide process, and the remaining examples illustrate the improved results obtained by means of this invention.

EXAMPLE 5

A mixture of 11.6 g. (0.1 mole) of hexamethylene diamine and 39.6 g. (0.2 mole) of dimethyl terephthalate was heated under nitrogen at 250° C. After two minutes, a violent evolution of methanol occurred, and the melt rapidly became viscous. To the melt was added 50 g. (0.42 mole) of hexane-1,6-diol and 0.5 ml. of catalyst solution prepared by adding 0.1 ml. of titanium butoxide to a solution of 0.1 g. of sodium in 50 ml. of absolute ethanol. The resulting mixture was heated for one hour at 270° C. and atmospheric pressure followed by heating under vacuum at 270° C. The viscosity of the melt rose very slowly, and a very low molecular weight polymer was obtained containing 3.5% nitrogen.

EXAMPLE 6

A mixture of 39 g. (0.2 mole) of dimethyl terephthalate, 50 g. (0.42 mole) of hexane-1,6-diol, 11.6 g. (0.1 mole) of hexamethylene diamine and 0.2 ml. of the catalyst solution described in the preceding example was heated at 175–250° C. for 30 minutes and at 250° C. for 20 minutes. The melt was then heated under vacuum at 275° C. for 10 minutes, but the polymer obtained was insoluble in phenol-tetrachloroethane solvent commonly used for inherent viscosity determinations. The polymer contained 5.2% nitrogen.

EXAMPLE 7

A mixture of 39.6 g. (0.2 mole) of dimethyl terephthalate, 50 g. (0.42 mole) of hexane-1,6-diol and 0.5 ml. of the catalyst solution of Example 5 was heated at 250° C. for 30 minutes. Thereafter, 11.6 g. of hexamethylene diamine was added, and the resulting mixture was heated for 45 minutes at 250° C. followed by stirring under vacuum at 275° C. The polymer obtained was of low molecular weight with an inherent viscosity of 0.44 and a nitrogen content of 3.0%.

EXAMPLE 8

A mixture of 39.6 g. (0.2 mole) of dimethyl terephthalate, 45 g. (0.5 mole) of butane-1,4-diol and 0.5 ml. of the catalyst solution of Example 5 was heated at 240° C. for 30 minutes. To the melt was added 5.8 g. (0.5 mole) of hexamethylene diamine, and the mixture was stirred under vacuum for 20 minutes at 275° C. The product was of low molecular weight and had an inherent viscosity of only 0.24.

EXAMPLE 9

A 9.7 g. portion (0.02 mole) of 1,6-bis(p-carboethoxyphenyl carbonyloxy)hexane was melted under an atmosphere of dry nitrogen at 240° C. To the melt was added 1.2 g. (0.01 mole) of hexamethylene diamine, and the temperature was raised to 275° C. over a 20 minute period. To the mixture was added 1.9 g. (0.01 mole) of dimethyl terephthalate and 2.4 g. (0.02 mole) of hexane-6-diol. After heating the mixture at 275° C. and 0.1 mm. pressure for 20 minutes, a polymer was obtained having an inherent viscosity of 0.6 and a melting point of 210° C.

The heterogeneous polyester-amides as described in the preceding Examples 5–9 have little utility as film and fiber-forming materials as compared to the copolyesters of this invention, as described in the following examples, which are among the best materials known for fiber and film applications.

EXAMPLE 10

A mixture of 44.5 g. (0.095 mole) of N,N'-bis(p-carbethoxybenzoyl)hexamethylene diamine, 0.95 g. (0.005 mole) of dimethyl terephahalate and 30 g. (0.25 mole) of hexane-1,6-diol was melted at 250° C. under a dry nitrogen stream. After the addition of 0.25 ml. of catalyst (prepared by adding 1.5 ml. of titanium butoxide to a solution of 0.1 g. of sodium dissolved in 50 ml. of absolute ethanol under nitrogen), the temperature was gradually raised from 240° C. to 275° C. over a period of 25 minutes, the temperature being raised as necessary to maintain the reaction mixture molten. The system was then evacuated with a water aspirator to remove the residual alcohol liberated during the ester-interchange. The melt was then polymerized by heating for 15 minutes at 275° C. and 0.3 mm. Hg pressure to give a copolyester having an inherent viscosity of 1.02 and a melting point of 268° C. This copolyester, in which the terephthalate amounted to 5 mole percent of the total amount of dicarboxylate monomers extruded readily into fibers and films, and showed improved quenchability over the corresponding polymer prepared by condensing hexane-1,6-diol with N,N'-bis(p-carboethoxybenzoyl)hexamethylene diamine without the use of terephthalate modifier. This is particularly of importance in the manufacture of films and fibers of relatively large cross-section wherein the unmodified polymer shows a slight tendency to crystallize during quenching unless carefully controlled conditions are employed. After orientation, fibers and films made from the copolyester described in this example show the excellent combination of mechanical and physical properties together with excellent dye affinity and moisture absorption properties characteristic of the polymers of glycols and N,N'-bis(p-carbalkoxybenzoyl)polymethylene diamines.

EXAMPLE 11

Increasing amounts of terephthalate component in the copolyesters of the invention give polymers with correspondingly lower melting points. In many cases, therefore, it is desirable to bring the melting point down somewhat in order to facilitate melt extrusion operations. For fiber and film applications, it is usually desirable to have melting points above about 230° C. although, in some cases, melting points down to about 200° C. or even lower are unobjectionable when the other properties of the polymers are maintained at a high level. A mixture of 42.2 g. (0.09 mole) of N,N'-bis(p-carbethoxybenzoyl) hexamethylene diamine, 1.9 g. (0.01 mole) of dimethyl terephthalate, 30 g. (0.25 mole) of hexane-1,6-diol, and 0.5 ml. of catalyst prepared as described in the preceding example was heated for 20 minutes over the range of 240–275° C. and then for 15 minutes at 275° C. and 0.3 mm. pressure in accordance with the process previously described. The resulting copolyester had an inherent viscosity of 1.13 and a melting point of 266° C.

EXAMPLE 12

A copolyester was prepared as described in Example 10 from 0.8 molar proportions of N,N'-bis(p-carbethoxybenzoyl)hexamethylene diamine, 0.2 molar proportions of dimethyl terephthalate and 2.5 molar proportions of hexane-1,6-diol. The resulting copolyester wherein the terephthalate formed 20% of the dicarboxylate components had an inherent viscosity of 1.16 and a melting point of 250° C. This copolyester as well as the one described in the following example are not only excellent fiber-forming materials but are particularly desirable materials for manufacture of film used for support in photographic applications. These copolyesters were readily melt extruded into fibers and films without the necessity of unduly high melt temperatures. The extruded articles readily quenched without crystallization, and after being drawn more than 200% at a temperature of about 60–70° C. and crystallized by heating at 170° C., the articles showed stability against heat distortion, excellent flexibility and wear resistance. Fibers formed from the polymers had strengths of the order of 6–8 g. per denier, and showed much better dye affinity and moisture absorption than unmodified terephthalate polyesters. Films of the copolyesters also showed excellent modulus and, when subbed with resin subs such as copolyester subs, formed excellent film base for supporting photosensitive silver halide emulsions in both black-and-white and color photographic films.

EXAMPLE 13

A mixture of 0.7 molar proportions of N,N'-bis(p-carbethoxybenzoyl)hexamethylene diamine, 0.3 molar proportions of dimethyl terephthalate and 2.5 molar proportions of hexane-1,6-diol was processed as described in Example 10. The resulting copolyester, in which 30 mole percent of the dicarboxylate component was terephthalate, had an inherent viscosity of 1.09 and a melting point of 245° C.

EXAMPLE 14

For many applications, other than film support for photographic film, including fiber manufacture and making of sheeting, etc., lower melting copolyesters are quite satisfactory and are often desirable from the standpoint of commercial manufacture. Thus, for example, copolyesters were prepared with increasing amounts of terephthalate component according to the process described. Typical data is set out in Table 1 for copolyesters of N,N'-bis(p-carbethoxybenzoyl)hexamethylene diamine, dimethyl terephthalate and hexane-1,6-diol, the mole percent of terephthalate set out in the first column being based on the total amount of terephthalate and amide-containing dicarboxylate monomer.

Table 1

| Mole Percent Terephthalate | Inherent Viscosity | Melting Point, ° C. |
| --- | --- | --- |
| 40 | 1.25 | 229 |
| 50 | 1.14 | 222 |
| 60 | 1.13 | 215 |
| 70 | 1.19 | 207 |
| 80 | 1.16 | 198 |
| 90 | 1.14 | 177 |

All of these copolyesters are excellent fiber-forming materials and possess good mechanical and physical properties. It is significant also to note the effect of even low concentrations of the amide-containing monomer, for a simple polyester of dimethyl terephthalate and hexane-1,6-diol containing no amide-containing monomer had an inherent viscosity of 1.07 but a melting point of only 152° C. The polymers of this invention can be used for a variety of applications other than fibers and film support, including tubing, molded articles, extruded articles, sheetings, coatings and the like. Even in small concentrations, the amide-containing monomer increases the melting point and gives a crystalline structure quite unlike unmodified terephthalate polyesters.

EXAMPLE 15

Any of the polymethylene glycols can be used in preparing the copolyesters in accordance with the invention. In the case of those materials wherein the total number of carbon atoms in the glycol plus the polymethylene unit between the nitrogen atoms of the amide-containing monomer is 10 or less, the terephthalate component not only improves quenchability but is also of utility in reducing the melting point of the polymer to a more workable range without otherwise deleteriously affecting the desirable properties of the polymer. Thus, for example, the unmodified polyester of butane-1,4-diol and an ester of N,N'-bis(p-carboxybenzoyl)hexamethylene diamine has a melting point of 300° C. In contrast to this, a mixture of 28 g. (0.06 mole) of N,N'-bis(p-carbethoxybenzoyl)hexamethylene diamine, 7.9 g. (0.04 mole) of dimethyl terephthalate and 18 g. (0.2 mole) of butane-1,4-diol was processed as in Example 10 using 0.5 ml. of catalyst. The first stage was carried out in 13 minutes at a temperature of 240-275° C., and the second stage was effected in 20 minutes at 275° C. and 0.3 mm. pressure. The resulting copolyester had an inherent viscosity of 0.92 and a melting point of 270° C.

EXAMPLE 16

Increasing the relative concentration of terephthalate component further reduces the melting point of polymers using short chain glycols. In Table II, data is set out for other copolyesters of butane-1,4-diol, N,N'-bis(p-carbethoxybenzoyl)hexamethylene diamine and dimethyl terephthalate. The mole percent of terephthalate is based on the total weight of terephthalate and N,N'-bis(p-carbethoxybenzoyl)hexamethylene diamine. The process employed was analogous to that employed in the preceding example, with the conditions used in the two stages being set out for each polymer. It can be seen that increasing amounts of terephthalate component slow the polymerization process considerably.

*Table II*

| Mole Percent Terephthalate | Stage I | | Stage II | | Press., mm. | Melting Point | Inherent Viscosity |
|---|---|---|---|---|---|---|---|
| | Time, min. | Temp., °C. | Time, min. | Temp., °C. | | | |
| 50 | 20 | 240-275 | 25 | 275 | 0.1 | 254 | 0.99 |
| 55 | 20 | 250-275 | 75 | 275 | 0.3 | 242 | 0.51 |
| 60 | 12 | 250-275 | 60 | 275 | 0.3 | 238 | 0.57 |

The data set out in Table II also demonstrates another advantage of the copolyesters, namely the rapid polymerization especially at concentrations of terephthalate up to 50 mole percent. With increasing concentration of terephthalate, the inherent viscosity necessary for fiber-formation also decreases somewhat, although the polymerization stage can be continued beyond the times shown for further polymer buildup.

EXAMPLE 17

The nature of the alkylene group in the amide-containing monomer can also be varied as described herein. For example, a mixture of 12 g. (0.028 mole) of N,N'-bis-(p-carbethoxybenzoyl)tetramethylene diamine, 4.65 g. (0.028 mole) of dimethyl terephthalate, 20 g. (0.15 mole) of hexane-1,6-diol and 0.5 ml. of catalyst solution prepared by dissolving 0.2 g. of sodium and 3.0 ml. of titanium butoxide in absolute ethanol to give a final volume of 100 ml., was heated first for 25 minutes over the range of 240-275° C., and then for 20 minutes at 275° C. and 0.3 mm. Hg pressure. The inherent viscosity of the resulting copolyester was 0.99, and its melting point was 260° C. The polymer was an excellent material for preparation of fibers and films.

EXAMPLE 18

A mixture of 36 g. (0.06 mole) of N,N'-bis(p-carbethoxybenzoyl)tetramethylene diamine, 7.8 g. (0.04) mole of dimethyl terephthalate, 40 g. (0.3 mole) of hexane-1,6-diol and 0.5 ml. of the catalyst described in the preceding example was heated for 25 minutes over the range of 250-275° C., and then for 25 minutes at 275° C. and 0.3 mm. pressure. The resulting copolyester had an inherent viscosity of 0.87 and a melting point of 264° C.

EXAMPLE 19

As has been indicated, the melting point of the polymer can be varied widely as desired by choice of reactants and relative proportions. Thus, for example, a mixture of 0.6 molar proportions of N,N'-bis(p-carbomethoxybenzoyl)ethylene diamine, 0.4 molar proportion of dimethyl terephthalate and 2.5 molar proportions of pentamethylene glycol was polymerized as described in the preceding example. The resulting copolyester had an inherent viscosity of 0.75 and a melting point of 280°C. As with the other copolyesters of the invention, this material quenched readily and extruded fibers and films prepared therefrom, after orientation, had excellent tensile strength, wear resistance, flexibility, moisture absorption and dye affinity.

The polymers herein described can also be prepared by any of the well known polymerization processes or under varying conditions known to the art. For example, a prepolymer can be prepared by coreacting the three reactants as usual at 240-275° C. for the ester-interchange stage followed by a short time, e. g. 5 minutes, under vacuum at a temperature above the melting point. The resulting low molecular weight polymer can then be pulverized and stored until needed. The powder can then be heated to a temperature of 5-25° C. below its melting point under vacuum until the polymerization is completed to the desired fiber-forming stage. Likewise, any of the esters of the dicarboxylate monomers as described can be used without affecting the nature of the copolyesters. Although the titanium catalysts are preferred, any of the other well known ester-interchange catalysts can be used. Particularly good results from the color standpoint are achieved when water is employed as a co-catalyst with the ester-interchange catalyst. The amount of catalyst can be varied without significantly affecting the course of the reaction.

Thus, by means of this invention, a new class of highly useful polymers are provided which are of particular utility in the manufacture of fibers, films and sheeting. The examples illustrate the unique combination of properties possessed by the polymers of the invention, and similar results are obtained with the other polymers within the scope of the invention as described herein. By means of this invention, it is possible to obtain in a single polymer the advantageous characteristics of both the polyesters and the polyamides.

In effecting the condensation reaction, the ester-interchange stage of the process is usually carried out at a temperature above 200° C. or above the melting point of the reactants. The second or polymerization stage is also usually carried out above 200° C. and can be effected above the melting point of the glycol ester (and the polymer being formed) in the melt process or at a temperature not more than 20° C. below the melting point of the glycol ester in the powder polymerization process. In the case of the polymers prepared from such glycols as tetramethylene, pentamethylene or hexamethylene glycol, the temperature in the polymerization stage is preferably at least 240° C. The temperature employed can be varied, of course, depending upon the polymerization time desired, the degree of vacuum employed, the melting point of the reactants and products and similar variable factors. The temperature employed should be at least as high as the boiling point of the glycol liberated at the pressure employed and can therefore be at or about the boiling temperature of the glycol if atmospheric pressure is employed or if a lower pressure is employed during the polymerization stage. The polymerization stage is desirably carried out at pressures below 1 mm. Hg for optimum results with pressures of 0.1-0.5 mm. or lower being particularly suitable. The polymerization stage is continued until the polymer obtained is capable of forming fibers and films (including sheets) which can be oriented to give the highly flexible and strong shaped articles for which these polymers are particularly adapted.

Although the invention has been described in detail with particular reference to certain preferred embodiments thereof, it will be understood that variations and modifications can be effected within the spirit and scope of the invention as described hereinabove and as defined in the appended claims.

We claim:

1. A highly polymeric copolyester having an inherent viscosity of at least 0.7 and a melting point of at least 200° C. and resulting from heating at 100-300° C. a mixture of monomeric bifunctional reactants consisting functionally of at least two molar proportions of alkylene glycol, with one molar proportion of a mixture of dicarboxylate monomers consisting of N,N'-bis(p-carboxybenzoyl)alkylene diamine, and terephthalic acid, each of said alkylene groups containing 2-10 carbon atoms, said terephthalic acid in combined form amounting to 5-90 mole percent of the total amount of said terephthalic acid and said N,N'-bis(p-carboxybenzoyl)alkylene diamine.

2. A highly polymeric copolyester according to claim 1 wherein the bifunctional reactants consist of dihydroxylic material consisting of at least one polymethylene glycol containing 2-10 carbon atoms, and dicarboxylic material consisting of 10-95 mole percent of a $C_1$-$C_6$ alkyl diester of N,N'-bis(p-carboxybenzoyl)polymethylene diamine wherein the polymethylene group contains 2-10 carbon atoms and 90-5 mole percent of a $C_1$-$C_6$ alkyl diester of terephthalic acid based on the total weight of said dicarboxylic material.

3. A highly polymeric copolyester in accordance with claim 1 wherein the bifunctional reactants consist of a polymethylene glycol containing 2-10 carbon atoms, a $C_1$-$C_6$ alkyl diester of N,N'-bis(p-carboxybenzoyl)ethylene diamine, and a $C_1$-$C_6$ alkyl diester of terephthalic acid, said diester of terephthalic acid amounting to 5-90 mole percent of the combined weight of said diesters.

4. A highly polymeric copolyester in accordance with claim 1 wherein the bifunctional reactants consist of a polymethylene glycol containing 2-10 carbon atoms, a $C_1$-$C_6$ alkyl diester of N,N'-bis(p-carboxybenzoyl)tetramethylene diamine, and a $C_1$-$C_6$ alkyl diester of terephthalic acid, said diester of terephthalic acid amounting to 5-90 mole percent of the combined weight of said diesters.

5. A highly polymeric copolyester in accordance with claim 1 wherein the bifunctional reactants consist of a polymethylene glycol containing 2-10 carbon atoms, a $C_1$-$C_6$ alkyl diester of N,N'-bis(p-carboxybenzoyl)hexamethylene diamine, and a $C_1$-$C_6$ alkyl diester of terephthalic acid, said diester of terephthalic acid amounting to 5-90 mole percent of the combined weight of said diesters.

6. A highly polymeric copolyester, in fiber form, having an inherent viscosity of at least 0.7, and being obtained by heating at 100-300° C. a mixture of bifunctional reactants consisting functionally of at least two molar proportions of alkylene glycol, and one molar proportion of a mixture of N,N'-bis(p-carboxybenzoyl)alkylene diamine, and terephthalic acid, each of said alkylene groups containing 2-10 carbon atoms, said copolyester having a melting point of at least 200° C., said terephthalic acid amounting to 5-50 mole percent and said diamine compound amounting to 95-50 mole percent of the total weight of said diamine and said terephthalic acid.

7. A highly polymeric copolyester, in sheet form, having an inherent viscosity of at least 0.7 and being obtained by heating at 100-300° C. a mixture of bifunctional reactants consisting functionally of at least two molar proportions of alkylene glycol, and one molar proportion of a mixture of N,N'-bis(p-carboxybenzoyl)alkylene diamine, and terephthalic acid, each of said alkylene groups containing 2-10 carbon atoms, said copolyester having a melting point of at least 200° C., said terephthalic acid amounting to 5-50 mole percent and said diamine compound amounting to 95-50 mole percent of the total weight of said diamine and said terephthalic acid.

8. A highly polymeric copolyester according to claim 1 wherein the bifunctional reactants consist of hexane-1,6-diol, a $C_1$-$C_6$ alkyl diester of N,N'-bis(p-carboxybenzoyl)hexamethylene diamine, and a $C_1$-$C_6$ alkyl diester of terephthalic acid, said diester of terephthalic acid amounting to 5-50 mole percent of the combined weight of said diesters, said copolyester having a melting point above 200° C.

9. A highly polymeric copolyester according to claim 1 wherein the bifunctional reactants consist of hexane-1,6-diol, a $C_1$-$C_6$ alkyl diester of N,N'-bis(p-carboxybenzoyl)tetramethylene diamine, and a $C_1$-$C_6$ alkyl diester of terephthalic acid, said diester of terephthalic acid amounting to 5-50 mole percent of the combined weight of said diesters, said copolyester having a melting point above 200° C.

10. A highly polymeric copolyester according to claim 1 wherein the bifunctional reactants consist of hexane-1,6-diol, a $C_1$-$C_6$ alkyl diester of N,N'-bis(p-carboxybenzoyl)ethylene diamine, and a $C_1$-$C_6$ alkyl diester of terephthalic acid, said diester of terephthalic acid amounting to 5-50 mole percent of the combined weight of said diesters, said copolyester having a melting point above 200° C.

11. The method which comprises heating at 100-300° C. a mixture of bifunctional reactants consisting functionally of at least two molar proportions of alkylene glycol, and one molar proportion of a mixture of 5-90 mole percent of N,N'-bis(p-carboxybenzoyl)alkylene diamine, and 95-10 mole percent of terephthalic acid, said heating being continued until a copolyester of at least 0.7 inherent viscosity is obtained.

12. The method according to claim 11 wherein the alkylene glycol is a polymethylene glycol containing 2-10 carbon atoms and wherein the diamine is a $C_1$-$C_6$ alkyl diester of an N,N'-bis(p-carboxybenzoyl)polymethylene diamine wherein the polymethylene group contains 2-10 carbon atoms, and wherein said terephthalic acid is employed in the form of a $C_1$-$C_6$ alkyl diester.

13. The method according to claim 11 wherein the glycol is hexane-1,6-diol, the diamine is a $C_1$-$C_6$ alkyl diester of N,N'-bis(p-carboxybenzoyl)hexamethylene diamine and the terephthalic acid is employed in the form of a $C_1$-$C_6$ alkyl diester.

14. The method according to claim 11 wherein the glycol is hexane-1,6-diol, the diamine is a $C_1$-$C_6$ alkyl diester of N,N'-bis(p-carboxybenzoyl)tetramethylene diamine and the terephthalic acid is employed in the form of a $C_1$-$C_6$ alkyl diester.

15. The method according to claim 11 wherein the glycol is hexane-1,6-diol, the diamine is a $C_1$-$C_6$ alkyl diester of N,N'-bis(p-carboxybenzoyl)ethylene diamine and the terephthalic acid is employed in the form of a $C_1$-$C_6$ alkyl diester.

16. The method according to claim 11 wherein the resulting copolyester is melt extruded and oriented by drawing the product resulting from extrusion at least 200%.

References Cited in the file of this patent

UNITED STATES PATENTS

| | | |
|---|---|---|
| 2,071,250 | Carothers | Feb. 16, 1937 |
| 2,692,253 | Holmen | Oct. 19, 1954 |